(12) United States Patent
Smith et al.

(10) Patent No.: US 10,040,583 B2
(45) Date of Patent: Aug. 7, 2018

(54) CARPET WRAPPING APPARATUS AND METHOD OF USING SAME

(71) Applicants: Adam Paul Smith, Dalton, GA (US); Ronald Edwin Headrick, Jr., Tunnel Hill, GA (US)

(72) Inventors: Adam Paul Smith, Dalton, GA (US); Ronald Edwin Headrick, Jr., Tunnel Hill, GA (US)

(73) Assignee: Perpetual Machine Company, Dalton, GA (US)

( * ) Notice: Subject to any disclaimer, the term of this patent is extended or adjusted under 35 U.S.C. 154(b) by 462 days.

(21) Appl. No.: 14/807,279

(22) Filed: Jul. 23, 2015

(65) Prior Publication Data
US 2017/0021952 A1 Jan. 26, 2017

(51) Int. Cl.
| | | |
|---|---|---|
| *B65B 11/04* | (2006.01) | |
| *B65B 41/02* | (2006.01) | |
| *B65B 51/20* | (2006.01) | |
| *B65B 41/04* | (2006.01) | |
| *B29C 65/10* | (2006.01) | |
| *B29C 65/18* | (2006.01) | |
| *B65B 25/14* | (2006.01) | |
| *B65H 19/22* | (2006.01) | |
| *B65B 51/10* | (2006.01) | |

(52) U.S. Cl.
CPC .............. *B65B 11/04* (2013.01); *B29C 65/10* (2013.01); *B29C 65/18* (2013.01); *B65B 25/146* (2013.01); *B65B 41/02* (2013.01); *B65B 41/04* (2013.01); *B65B 51/20* (2013.01); *B65H 19/2269* (2013.01); *B65B 2051/105* (2013.01)

(58) Field of Classification Search
CPC ....... B65B 11/04; B65B 11/045; B65B 11/56; B65B 2210/14; B65B 2210/16; B65B 25/146; B65B 25/148; B65B 41/12–41/16; B65B 45/00; B65H 2301/41425
USPC ... 53/389.1–389.4, 587, 461, 465, 211, 216; 226/7, 97.1–97.3
See application file for complete search history.

(56) References Cited

U.S. PATENT DOCUMENTS

| | | | | |
|---|---|---|---|---|
| 3,407,565 A | * | 10/1968 | Bender | ................. B65B 25/148 100/8 |
| 3,633,335 A | * | 1/1972 | Johnson | ................. B65B 25/148 53/372.9 |
| 3,716,964 A | * | 2/1973 | Reynolds | ................. B65B 41/06 53/211 |

(Continued)

*Primary Examiner* — Stephen F Gerrity
*Assistant Examiner* — Joshua Kotis
(74) *Attorney, Agent, or Firm* — Robert E. Richards; Richards IP Law

(57) ABSTRACT

The invention comprises a carpet wrapping apparatus. The apparatus comprises a pair of rotatable rollers for supporting a roll of sheet material and for rotating the roll of sheet material supported thereon and a vertically extending curtain disposed adjacent and spaced from the roll of sheet material so that there is a horizontal gap between the curtain and the roll of sheet material when supported on the rollers. The apparatus also comprises a source of pressurized air directed toward the curtain and a plastic film dispenser disposed above the rollers for dispensing a plastic film between the curtain and the source of pressurized air so that the pressurized air blows the plastic film toward the curtain and into the gap. A method of wrapping a roll of carpet with a plastic film is also disclosed.

8 Claims, 15 Drawing Sheets

(56) References Cited

U.S. PATENT DOCUMENTS

| | | | | |
|---|---|---|---|---|
| 3,844,189 | A * | 10/1974 | Jardine | B21C 47/34 226/97.1 |
| 4,341,586 | A * | 7/1982 | Koutonen | B65B 25/148 156/518 |
| 4,485,612 | A * | 12/1984 | Piesen | B65B 25/148 53/136.2 |
| 4,624,096 | A * | 11/1986 | Nordstrom | B65B 11/12 53/209 |
| 5,071,501 | A * | 12/1991 | Doi | B65B 25/148 156/187 |
| 5,189,865 | A * | 3/1993 | Andrade | B65B 11/08 53/228 |
| 5,328,136 | A * | 7/1994 | Muller | B65H 19/28 226/97.1 |
| 5,477,659 | A * | 12/1995 | Conrad | B65B 25/148 53/127 |
| 6,298,634 | B1 * | 10/2001 | Cramer | B65B 25/148 53/389.4 |
| 2003/0019185 | A1 * | 1/2003 | Takahashi | B65B 25/148 53/204 |
| 2003/0061788 | A1 * | 4/2003 | Maki-Rahkola | B65B 25/148 53/415 |
| 2004/0250510 | A1 * | 12/2004 | Dalietos | B65B 25/148 53/399 |

\* cited by examiner

CARPET WRAPPING APPARATUS AND METHOD OF USING SAME

FIELD OF THE INVENTION

The present invention generally relates to wrapping rolled material. More particularly, this invention relates to an apparatus for wrapping rolled material in a plastic film. More specifically, the present invention relates to an apparatus for wrapping a roll of carpet in a plastic film. The present invention also relates to an apparatus for sealing and cutting plastic film after it is wrapped around a roll material, especially a carpet. The present invention also relates to an apparatus for twisting and sealing plastic film on the end of a roll of material, especially a carpet. The present invention also relates to an apparatus for inserting a core insert in the end of a core around which rolled material is wound. The present invention also relates to a method for wrapping a roll of material, for twisting and sealing the end of the plastic wrapped around the roll of material and to a method of inserting a core insert into a core around which rolled material is wound.

BACKGROUND OF THE INVENTION

After carpet, such as broadloom or tufted carpet, is made it is usually cut to a segment of a desired length and rolled into a roll for storage and/or shipping. The carpet segment is usually wound around a hollow cardboard cylinder or core. Depending on the type of carpet and its method of manufacture, the carpet, and therefore the carpet roll, can vary in width. However, much of the carpet currently manufactured has a width between approximately 12 feet and approximately 15 feet. Moreover, depending on the length of a carpet segment in a carpet roll, the diameter of the roll will very from approximately a foot to approximately several feet.

In order to protect carpet during storage and/or shipment, a roll of carpet is usually wrapped in a plastic film. This is typically performed manually with one person positioned at each end of a carpet roll. The carpet roll typically sits on a pair of rotatably driven rollers. The two operators actuate the rollers in a synchronized action to rotate the carpet roll. The people positioned on the ends of the carpet roll manually pull plastic film from a roll positioned above the roll of carpet and pull the plastic film around the roll of carpet as it rotates. Then, at least one of those people must seal the plastic film on the roll of carpet and cut the plastic film free from the supply roll. Finally, the plastic film in the ends of the rolls must be inserted into the cardboard core and a core insert placed in the core to retain the plastic film therein. This manual process is labor intensive. It is also fraught with potential for injury to the people performing the foregoing tasks.

Thus, there is a need for an automated process for wrapping rolls of material, especially carpet, in plastic film, sealing the plastic film on the roll of material and cutting the plastic film free from the supply roll. It would also be desirable to have an automated process for sealing the plastic film on at least one end of the roll of material and for automatically inserting a core insert into the core.

SUMMARY OF THE INVENTION

The present invention satisfies the foregoing needs by providing an improved wrapping system for rolls of material, especially carpet. In a preferred disclosed embodiment, the present invention provides an apparatus for performing the foregoing tasks. In another preferred disclosed embodiment, the present invention provides a method for performing the foregoing tasks.

In one disclosed embodiment, the present invention comprises an apparatus. The apparatus comprises a pair of rotatable rollers for supporting a roll of sheet material and for rotating the roll of sheet material supported thereon and a vertically extending curtain disposed adjacent and spaced from the roll of sheet material so that there is a horizontal gap between the curtain and the roll of sheet material when supported on the rollers. The apparatus also comprises a source of pressurized air directed toward the curtain and a plastic film dispenser disposed above the rollers for dispensing a plastic film between the curtain and the source of pressurized air so that the pressurized air blows the plastic film toward the curtain and into the gap.

In another disclosed embodiment, the present invention comprises a method. The method comprises disposing a vertically extending curtain adjacent and spaced from a roll of sheet material to form a horizontal gap therebetween and dispensing a portion of plastic film from a roll of plastic film positioned above the roll of sheet material and spaced from the curtain. The method also comprises blowing air toward the dispensed portion of plastic film so that the plastic film is blown toward the curtain and into the gap.

In another disclosed embodiment, the present invention comprises an apparatus for twisting and sealing plastic film wrapped around a roll of sheet material wherein a portion of the plastic material extends beyond an end of the roll of sheet material. The apparatus comprises a pair of rollers for supporting the roll of sheet material and for rotating the roll of sheet material supported thereon and a pair of elongate members spaced from each other, wherein the pair of elongate members are movable from a first position to a second position, wherein the pair of elongate members are spaced further from each other in the first position than in the second position and wherein the pair of elongate members are selectively engagable with the portion of the plastic film extending beyond the end of the roll of sheet material so that the portion of plastic film is captured between the pair of elongate members when in the second position and when the roll of sheet material is rotated thereby twisting the portion of plastic film captured between the pair of elongate members. The apparatus also comprises a source of pressurized and heated air directed toward the portion of plastic film captured between the pair of elongate members when in the second position, wherein the heated air is sufficiently hot to seal the plastic film to itself for the portion of the plastic film twisted between the pair of elongate members.

In another disclosed embodiment, the present invention comprises a method. The method comprises positioning a pair of elongate members such that a portion of plastic film extending beyond an end of a roll of sheet material wrapped in the plastic film is disposed between the pair of elongate members and rotating the roll of sheet material about its longitudinal axis. The method also comprises blowing heated air directed at the portion of plastic film disposed between the elongate members.

Accordingly, it is an object of the present invention to provide an improved carpet wrapping system.

Another object of the present invention is to provide an improved apparatus and method for wrapping rolls of sheet material in plastic film.

Another object of the present invention is to provide an improved apparatus and method for wrapping rolls of carpet.

A further object of the present invention is to provide an apparatus and method for wrapping rolls of sheet material that require less manual labor.

Another object of the present invention is to provide an apparatus and method for wrapping rolls of sheet material that is safer to operate.

Another object of the present invention is to provide an apparatus and method for wrapping rolls of sheet material that is more efficient than prior art systems.

Still another object of the present invention is to provide an apparatus and method for wrapping rolls of sheet material that can accommodate rolls of different widths and diameters.

Another object of the present invention is to provide an apparatus and method for sealing and cutting plastic film wrapping a roll of sheet material.

Another object of the present invention is to provide an apparatus and method for twisting and sealing an end of plastic film that wraps a roll of sheet material.

Yet another object of the present invention is to provide an apparatus and method for inserting a core insert into a core of a roll of material.

These and other objects, features and advantages of the present invention will become apparent after a review of the following detailed description of the disclosed embodiments and the appended drawing and claims.

DETAILED DESCRIPTION OF THE DISCLOSED EMBODIMENTS

Figure 1:
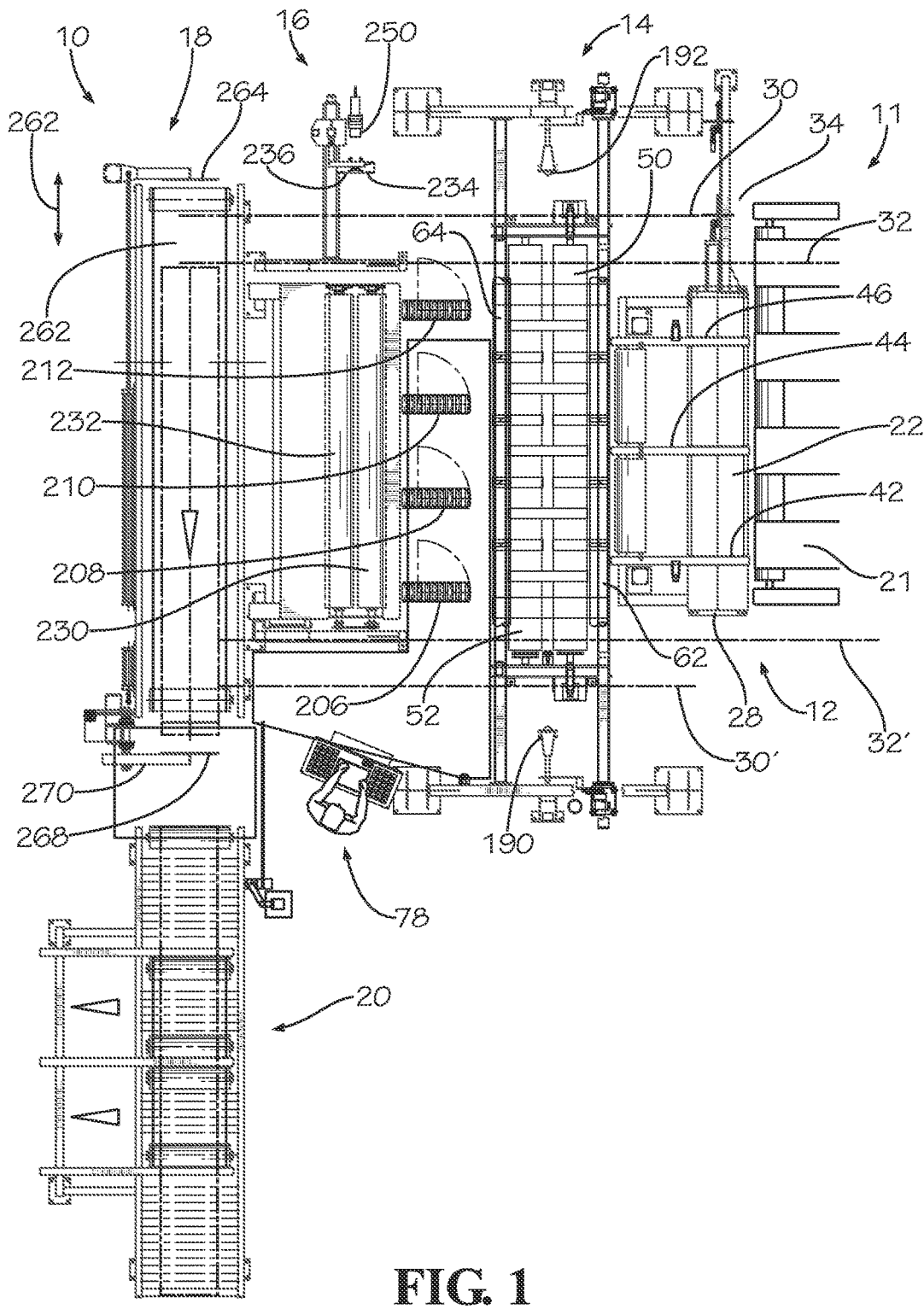
FIG. 1 is a partial plan view of a disclosed embodiment of a carpet wrapping apparatus in accordance with the present invention.

Referring now to the drawing in which like numbers indicate like elements throughout the several views, there is shown in FIG. 1 a disclosed embodiment of a carpet wrapping apparatus 10 in accordance with the present invention. The carpet wrapping apparatus 10 includes a carpet roll staging table 11, a carpet roll centering station 12, a wrapping station 14, a twisting/sealing station 16, a core insert station 18 and an out-feed conveyor 20.

Figure 2:
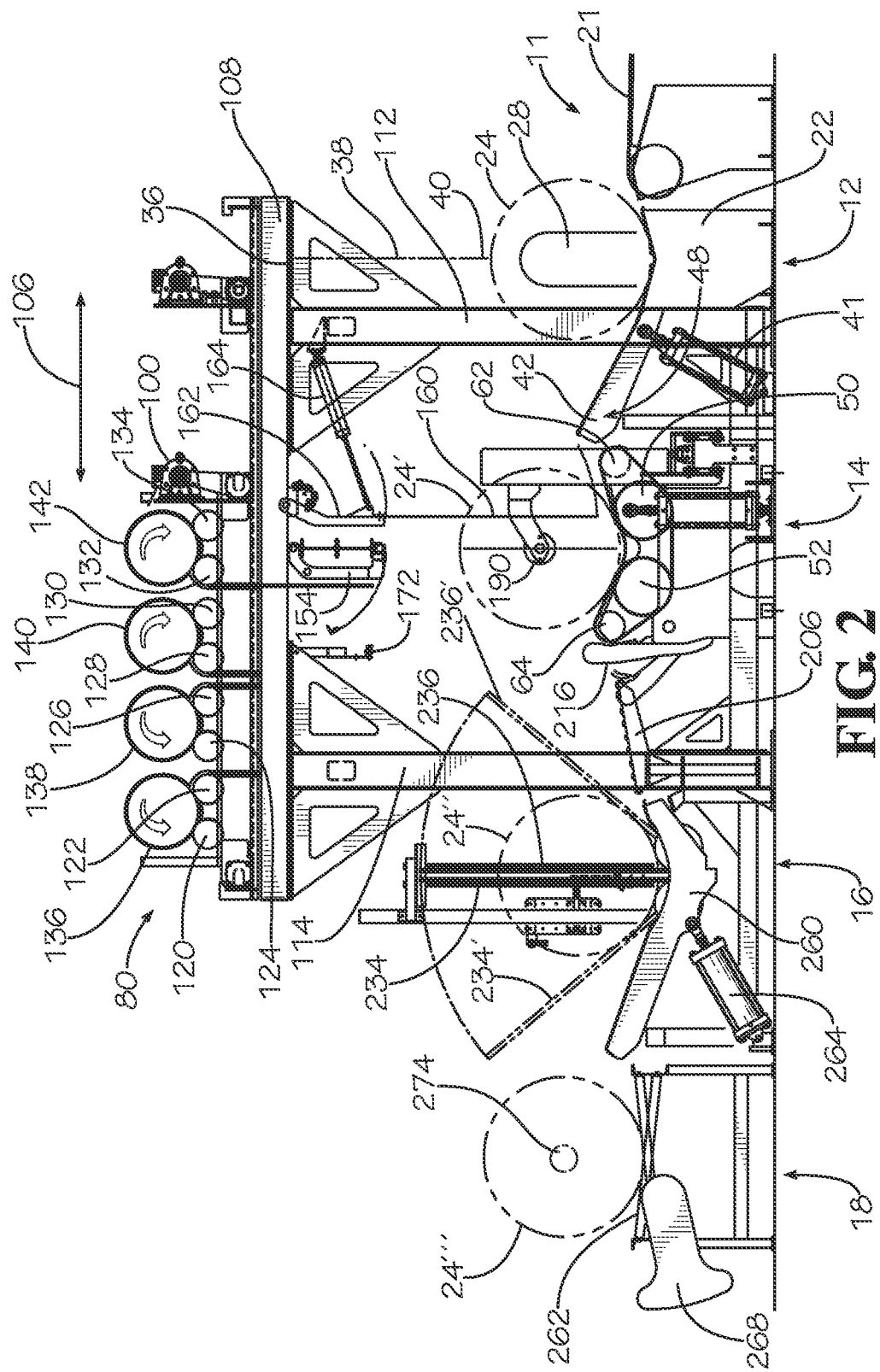
FIG. 2 is a partially side view of the carpet wrapping system shown in FIG. 1.

Carpet typically is manufactured in different widths; e.g., 12 feet and 15 feet. The carpet wrapping apparatus 10 of the present invention is designed to accommodate different widths of carpet as well as rolls of carpet that are of different diameters. The staging table 11 comprises an in-feed conveyor 21. The centering station 12 comprises a V-shaped bed 22 for receiving a roll of carpet 24 (shown in phantom in FIG. 2) from the in-feed conveyor 21. A shuttle 28 moves the roll of carpet 24 longitudinally on the V-shaped bed 22 in order to center the roll of carpet for processing at the wrapping station 14. A 15-foot wide carpet extends between the dotted lines 30, 30'; a 12-foot carpet extends between the lines 32, 32'. A photo detector (not shown) is positioned approximately at 34 (FIG. 1). Therefore, when a 12-foot wide carpet is centered between the lines 32, 32', ambient light will be blocked by the roll of carpet 24, and, therefore, will not provide a signal to an appropriately programmed computer controller (not shown). Intermediate widths may be accommodated with additional photo detectors (not shown) appropriately placed. A laser (not shown) is positioned at approximately 36 (FIG. 2). The laser positioned approximately at 36 measures the distance 38 (indicated as a dotted line) from the laser to the top 40 of the roll of carpet 24. This distance is provided to the computer controller (not shown) where the diameter of the roll of carpet is calculated by subtracting the distance 38 from the distance from the laser to the V-shaped bed 22. After the roll of carpet 24 is centered at the staging table 12, a pneumatic cylinder 41 is extended thereby tilting the V-shaped table 22, which is mounted to three pivot arms 42, 44, 46 pivotably mounted at one end. When the V-shaped bed is tilted up, the roll of carpet 24 rolls down the pivot arms 42-46 from the V-shaped table to the wrapping station 14.

The wrapping station 14 comprises a pair of main rollers 50, 52, which are rotatably mounted about their longitudinal axes at each end thereof. An electric motor 54 (FIG. 5) rotatably drives the roller 50. A sprocket 56 on the end of the main roller 52 drives a chain 58 which mates with a sprocket 60 on the end of the other main roller 50, such that the rollers 50, 52 can be selectively rotatably driven at a desired speed and in a desired direction. The wrapping station 14 also comprises an in-feed roller 62 and an out-feed roller 64, which are rotatably mounted at their ends. As can be seen in FIG. 2, the in-feed roller 62 and the out-feed roller 64 are of smaller diameters than the main rollers 50, 52 so that the rollers 50, 52, 62, 64 form a V-shaped cradle for rotatably supporting the roll of carpet 24' (shown in phantom). The in-feed roller 62 and the out-feed roller 64 are also mounted higher than the main rollers 50, 52. The main rollers 50, 52 have a plurality of conveyor cradle belts, such as belts 66, 68, connecting the rollers. Connecting the main roller 50 and the in-feed roller 62 are a plurality of conveyor in-feed belts, such as the belts 70, 72. Connecting the main roller 52 and the out-feed roller 64 are a plurality of conveyor out-feed belts, such as the belts 74, 76. Connecting all of the rollers 50, 52, 62, 64 are main belts, such as the belt 77, which encircles all four rollers. Thus, when the main rollers 50, 52 are driven at a desired speed and in a desired direction by the motor 54, the in-feed roller 62 and the out-feed roller 64 are driven by the in-feed belts, such as the belts 70, 72, the out-feed belts, such as the out-feed belts 74, 76, respectively, and the main belts, such as the main belt 77. The speed and direction that the rollers 50, 52, 62, 64 rotate are controlled by an operator 78 and/or by the computer controller (not shown). In a disclosed embodiment of the present invention, the cradle belts, such as belts 66, 68, the in-feed belts, such as the belts 70, 72, the out-feed belts, such as the out-feed belts 74, 76, and the main belts, such as the main belt 77, are made from reinforced white nitrile plastic.

Figure 4:
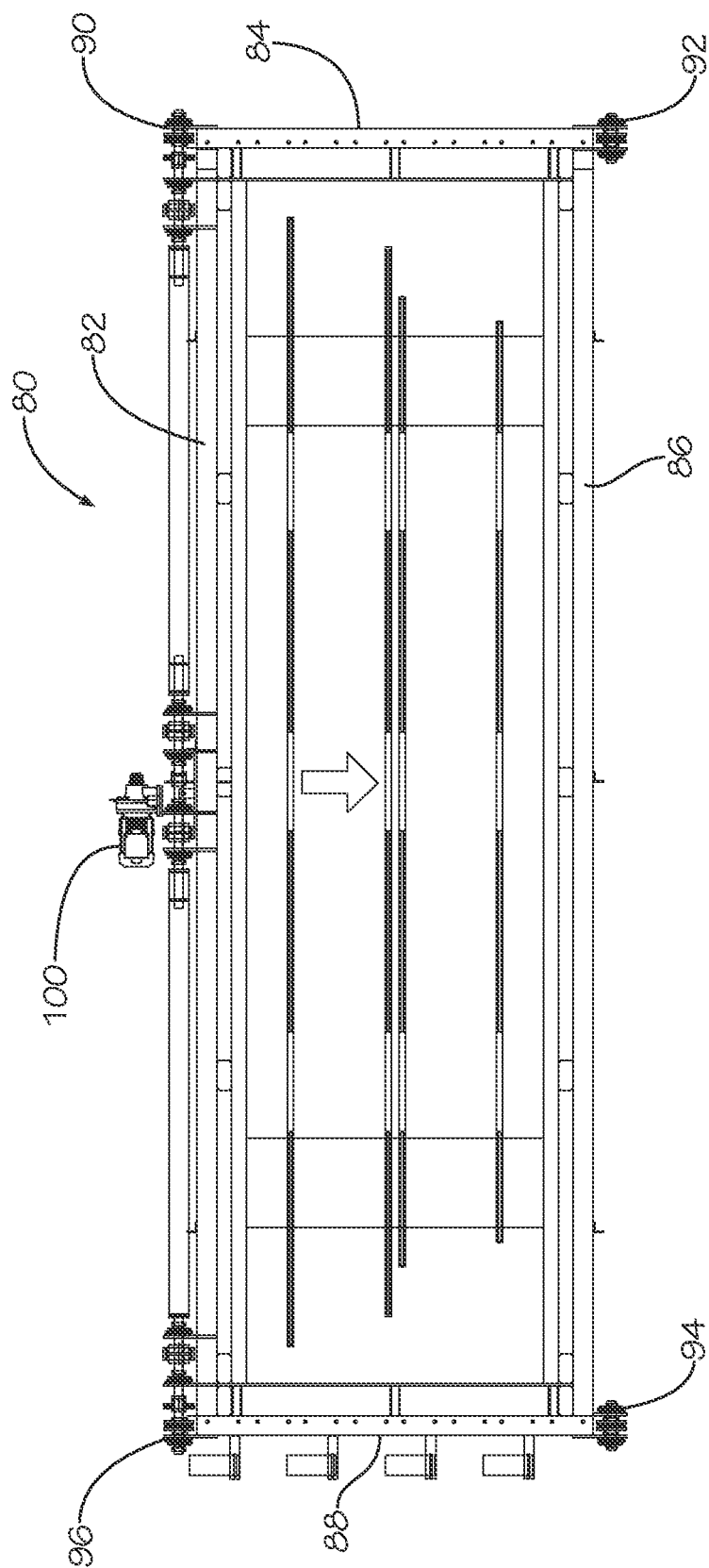
FIG. 4 is a plan view of a plastic carrier cradle shown in FIG. 2.
Figure 6:
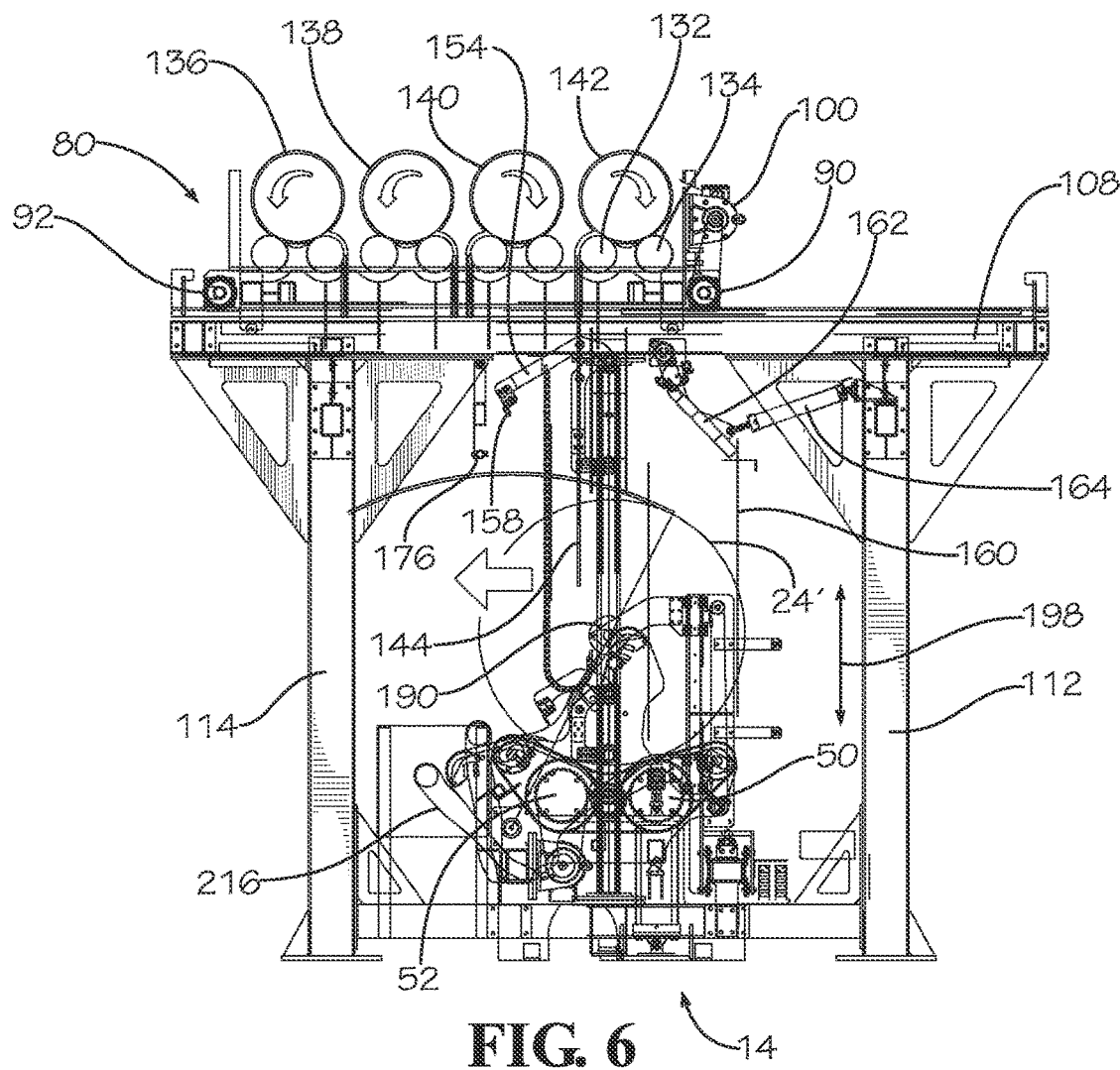
FIG. 6 is a side view of the carpet wrapping station shown in FIG. 5.

Disposed above the rollers 50, 52, 62, 64 is a plastic film transport cradle 80 (FIGS. 2, 4 and 6). The plastic film transport cradle 80 comprises four rectangular frame elements 82, 84, 86, 88, which are mounted on wheels 90, 92, 94, 96 at the four corners of the frame. The wheels 90, 96 are mounted on an axle 98 that is rotatably driven by a motor 100. The wheels 90-96 ride on rails 102, 104 such that the motor 100 can move the plastic film transport cradle 80 back and forth in the directions shown by the arrow 106 (FIG. 2). The track is supported by two beams 108, 110, which are supported by four stanchions 112, 114, 116, 118. Disposed on the plastic film transport cradle 80 are four pairs of rollers 120, 122, 124, 126, 128, 130, 132, 134, which are rotatably mounted on their longitudinal axes at each end thereof. Each pair of rollers 120-134 is rotatably driven by motors (not shown). Disposed on each pair of rollers 120-134 is a roll of thermoplastic plastic film 136, 138, 140, 142. The motors (not shown) separately and independently rotate the pairs of rollers 120-134 selectively and independently rotate the rolls of plastic film 136-142 in the direction shown by the arrows. Thus, plastic film from the rolls of plastic film 136-142 can be selectively fed downwardly from the plastic film transport cradle 80 toward the rollers 50, 52, 62, 64. As shown in FIG. 6, the roll of plastic film 142 is in the position to feed a portion of a sheet of plastic film 144 downwardly by rotating the roll of plastic film 142 in a clockwise direction. Each of the rolls of plastic film 136-142 is a different width. Therefore, if a different width plastic film is required, the plastic film transport cradle 80 can be moved until one of the other rolls of plastic film 136-140 is positioned in the plastic film dispensing position. Thus, depending on the width and diameter of the roll of carpet 24', the appropriate width of plastic film from the rolls of plastic film 136-142 can be selected for dispensing and used for wrapping around the roll of carpet 24'. For example, in a disclosed embodiment of the present invention the roll of plastic film 136 is 186 inches wide, the roll of plastic film 138 is 196 inches wide, roll of plastic film 140 is 202 inches wide and the roll of plastic film 142 is 228 inches wide. Other widths of plastic film can be used depending on the width and diameter of the roll goods being wrapped.

Figure 5:
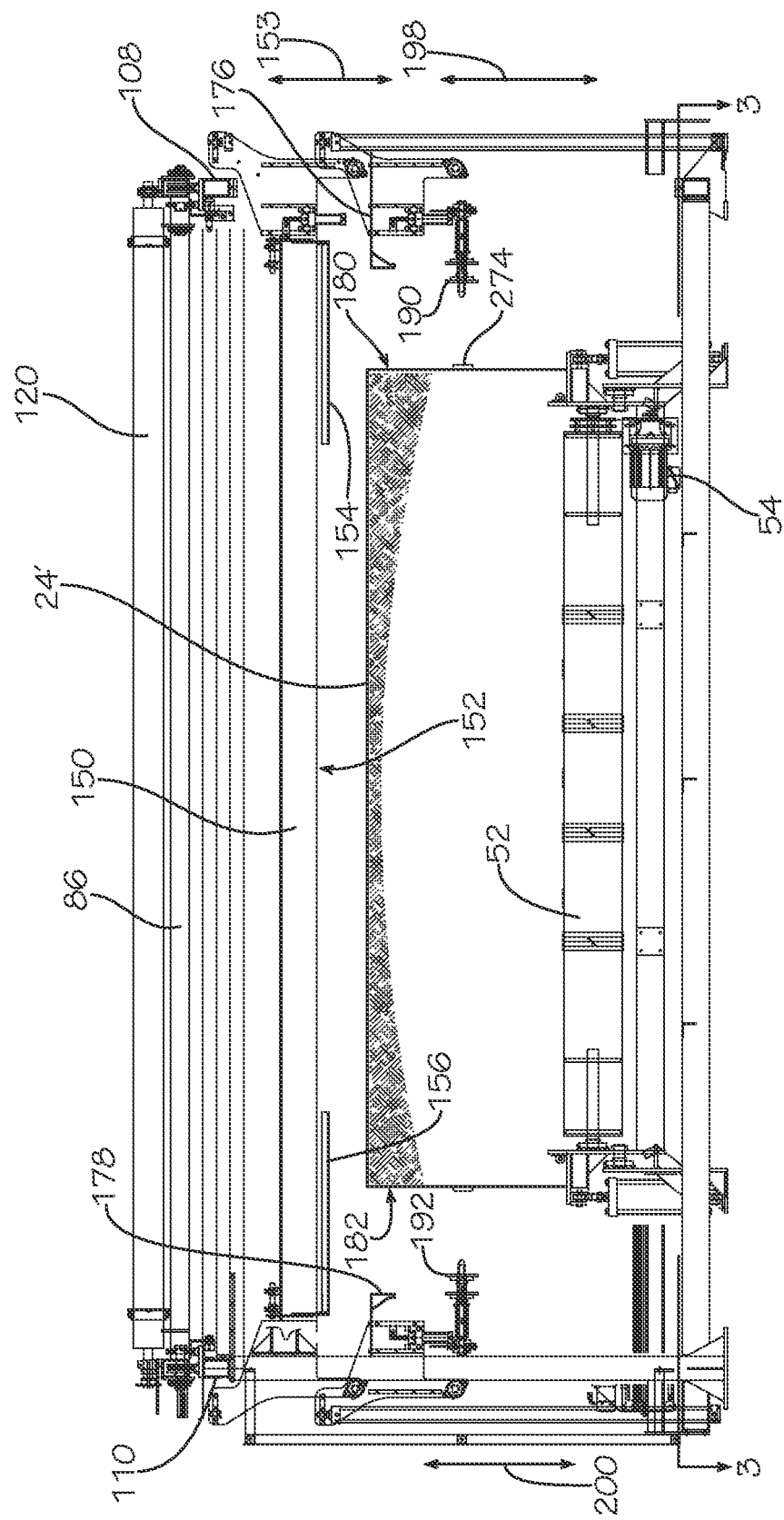
FIG. 5 is a side view of the carpet wrapping station shown in FIG. 2 shown from the exit side.
Figure 12:
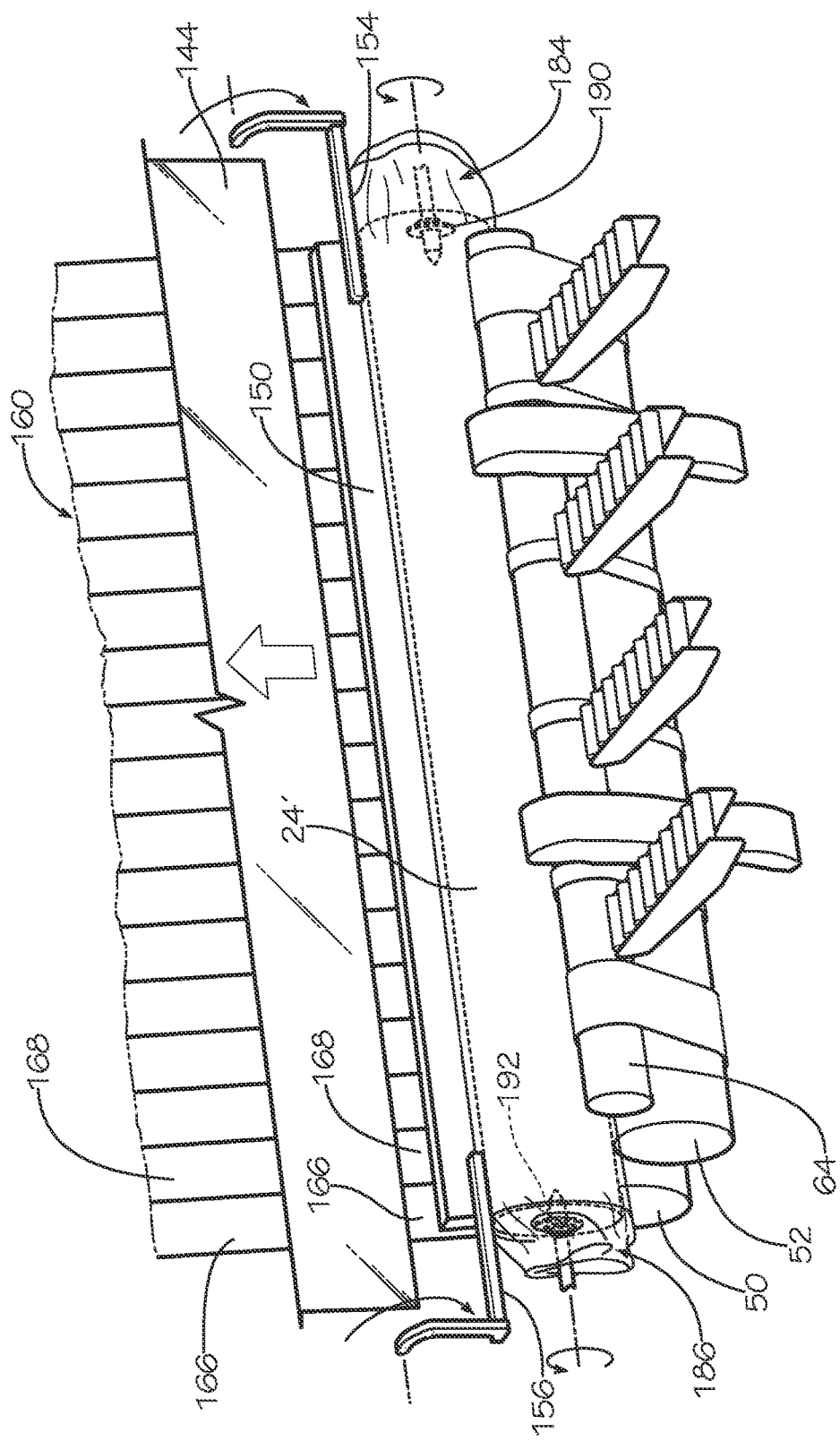
FIG. 12 is a schematic perspective view of the carpet wrapping station shown in FIG. 8 shown with the plastic film sealing beam in the sealing position and the plastic film chopper blade in the plastic film cutting position.

Disposed below the beams 108, 110 is a movable sealing beam 150. The lower edge 152 of the sealing beam 150 comprises a sealing element (not shown), which includes an electric heating element for heating the sealing element to an appropriate temperature for sealing the plastic film to itself. The sealing beam 150 is movable up and down in the directions shown by the arrows 153 (FIG. 5) from an upper or retracted position, as shown in FIGS. 5 and 6, to a lower or sealing position, as shown in FIG. 12, so that the sealing element contacts the plastic film wrapped around the roll of carpet 24'. Attached to the sealing beam 150 at each end thereof are two plastic film chopper bars 154, 156. Each of the chopper bars 154, 156 are pivotably mounted at one end thereof so that the opposite end is movable in an arc from a retracted position, as shown in FIG. 6, to a cutting position as shown in FIGS. 2 and 5. A pneumatic cylinder (not shown) is attached to each of the chopper bars 154, 156 to move them between the retracted position and the cutting position. The leading edge of each of the chopper bars 154, 156 includes a knife blade 158 (only one of which is shown on the chopper bar 154 shown in FIG. 6) made from a non-stick plastic, such as Teflon®. Since the chopper bars 154, 156 are attached to the sealing beam 150, the chopper bars move up and down with the sealing beam. Furthermore, the sealing beam 150 is wider than the widest plastic film used to wrap the roll of carpet 24'. When the chopper bars 154, 156 are in the retracted position, the sheet of plastic film 144 feeds downwardly from one of the rolls of plastic film 136-142 so that the sheet of plastic film is disposed between the sealing beam 150 and the knife blade 158 of the chopper bars.

Also disposed below the beams 108, 110 is a plastic curtain 160. The upper end of the plastic curtain 160 is attached to one end of a swing arm 162; the other end of the swing arm is pivotably attached to the beam 108. An identical swing arm (not shown) is attached to the upper end of the curtain 160 and the other end is pivotably attached to the beam 110. A pneumatic positioning cylinder 164 is attached to each of the swing arms 162 (only one of which is shown). The pneumatic positioning cylinder 164 moves the swing arm 162 from the position shown in FIG. 2 to the position shown in FIG. 6 and any position in between. By moving the swing arm 162, the position of the curtain 160 relative to the roll of carpet 24' can be adjusted so that rolls of carpet of different diameters can be accommodated. The curtain 160 is preferably made from a plurality elongate strips of plastic, such as the strips 166, 168, 170, hung adjacent to each other. By using a plurality of strips of plastic, such as vinyl, air can pass between adjacent strips, such as between the vertical strip 166 and the vertical strip 168. The curtain 160 is approximately as wide as the narrowest roll of carpet 24'; i.e., approximately 12 feet wide, processed by the wrapping apparatus 10. And, the sheet of plastic film 144 is wider than the curtain 160 and also wider than the roll of carpet 24'.

Figure 3:
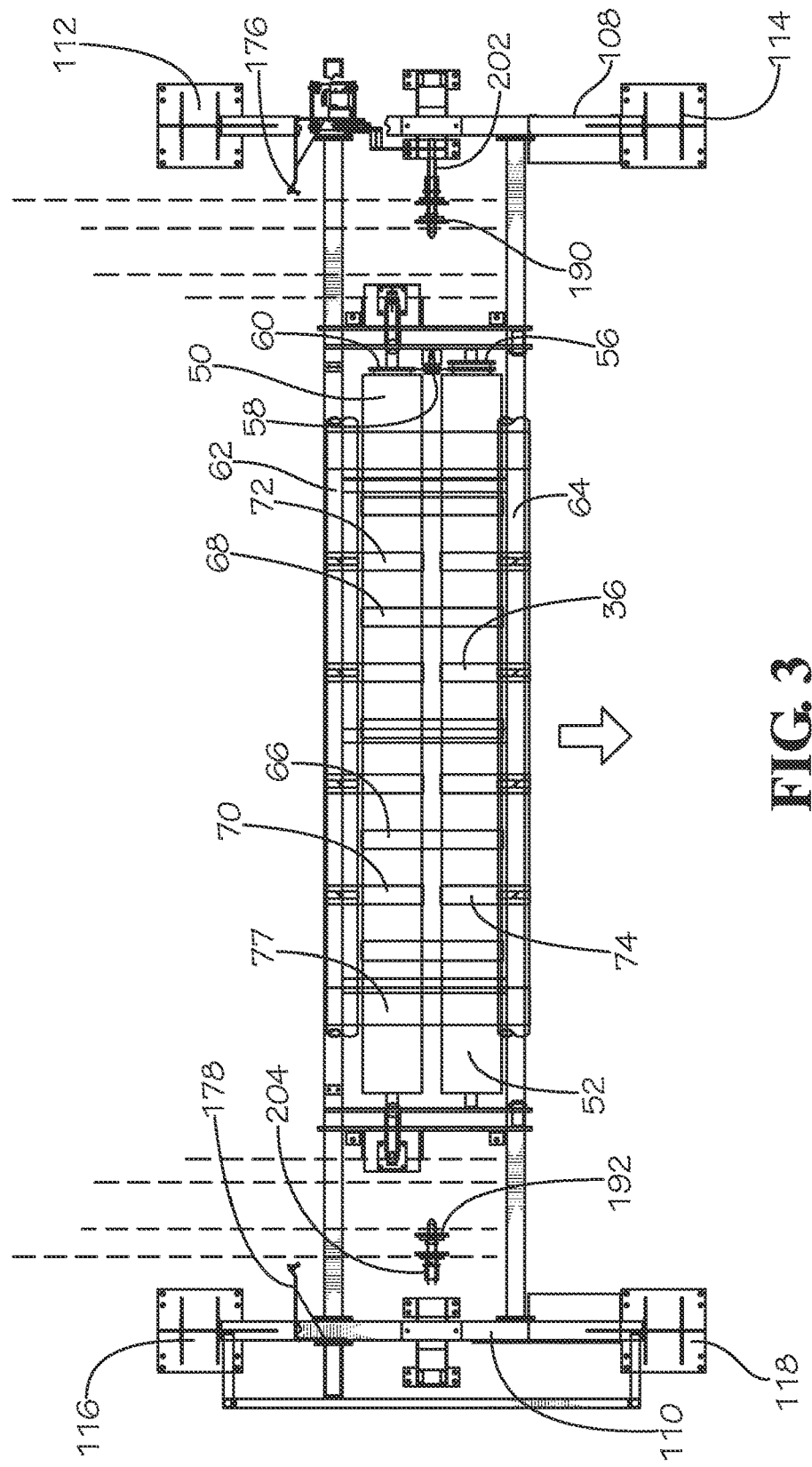
FIG. 3 is a plan view of a carpet wrapper cradle shown in FIG. 1.
Figure 10:
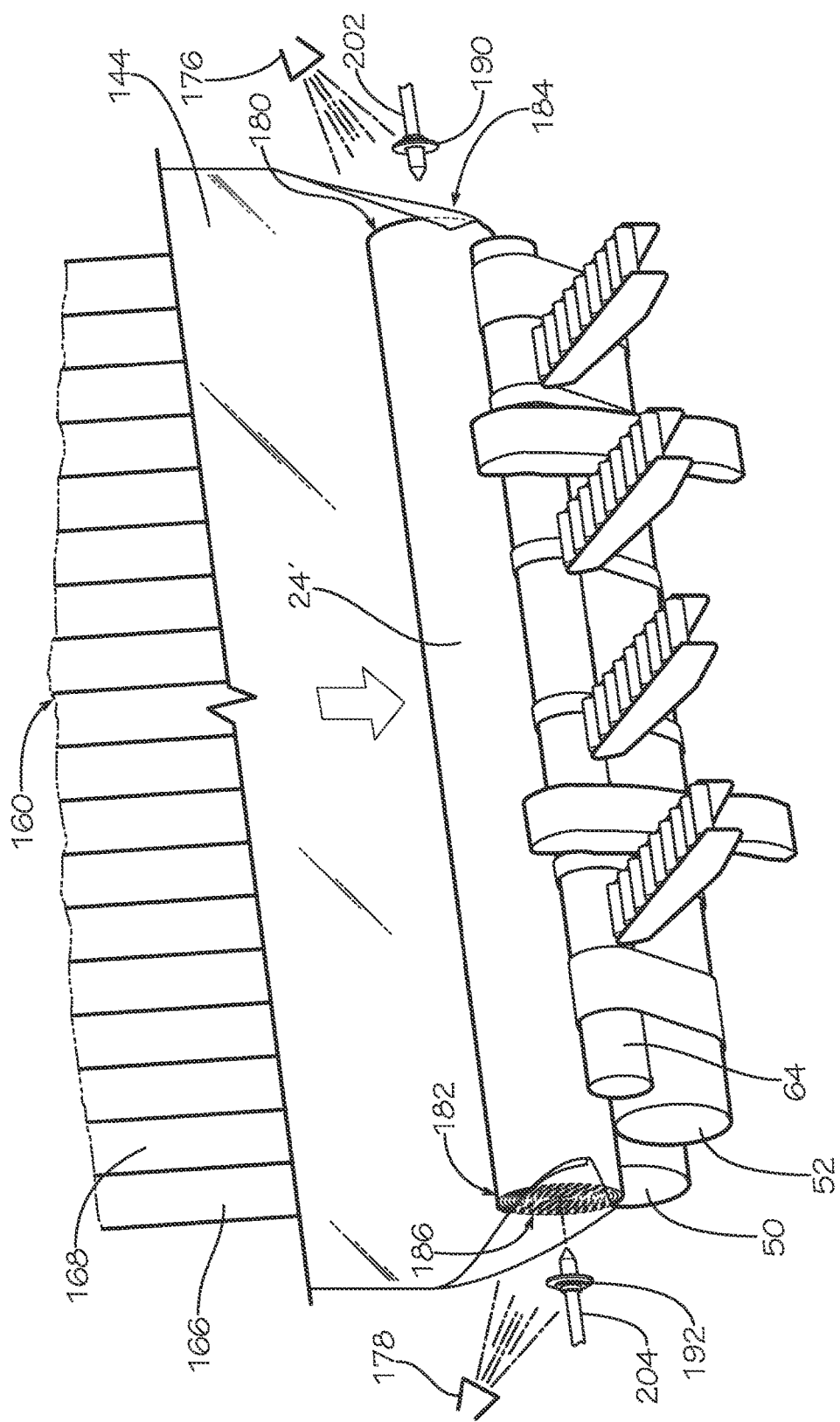
FIG. 10 is a schematic perspective view of the carpet wrapping station shown in FIG. 8 shown with the edge portion of the plastic wrapping film covering the ends of a roll of carpet.

Disposed below the beams 108, 110 are a plurality of nozzles, such as the nozzle 172 (only one of which is shown in FIGS. 2 and 6) which are disposed at intervals across the width of the wrapping station 12. The nozzles, such as the nozzle 172, direct pressurized air toward the curtain 160. As stated above, when the chopper bars 154, 156 are in the retracted position, the sheet of plastic film 144 feeds downwardly so that the sheet of plastic film is disposed between the sealing beam 150 and the knife blade 158 of the chopper bars. The nozzles, such as the nozzle 172, are disposed so that the sheet of plastic film 144 is disposed between the nozzles and the sealing beam 150. Thus, the pressurized air from the nozzles, such as the nozzle 172, blow the sheet of plastic film 144 toward the curtain 160. As the sheet of plastic film 144 is dispensed downwardly from one of the rolls 136-142, the pressurized air from the nozzles, such as the nozzle 172, carries the film into and through a horizontal gap (shown by the arrows 174) between the roll of carpet 24' and the curtain 160 (see FIG. 8). Disposed between the wrapping station 14 and the centering station 12 are a pair of nozzles 176, 178, which direct pressurized air toward the opposite ends 180, 182 of the roll of carpet 24', respectively. The sheet of plastic film 144 is disposed between the nozzles 176, 178 and the ends 180, 182 of the roll of carpet 24' (see FIGS. 3 and 10). The nozzles 176, 178 are also disposed so that the curtain 160 is not disposed between the nozzles and the sheet of film 144. The nozzles 176, 178 are disposed so that the pressurized air from the nozzles blows the edge portions 184, 186 of the sheet of plastic film 144 over the ends 180, 182 of the roll of carpet 24' (FIG. 10).

Figure 11:
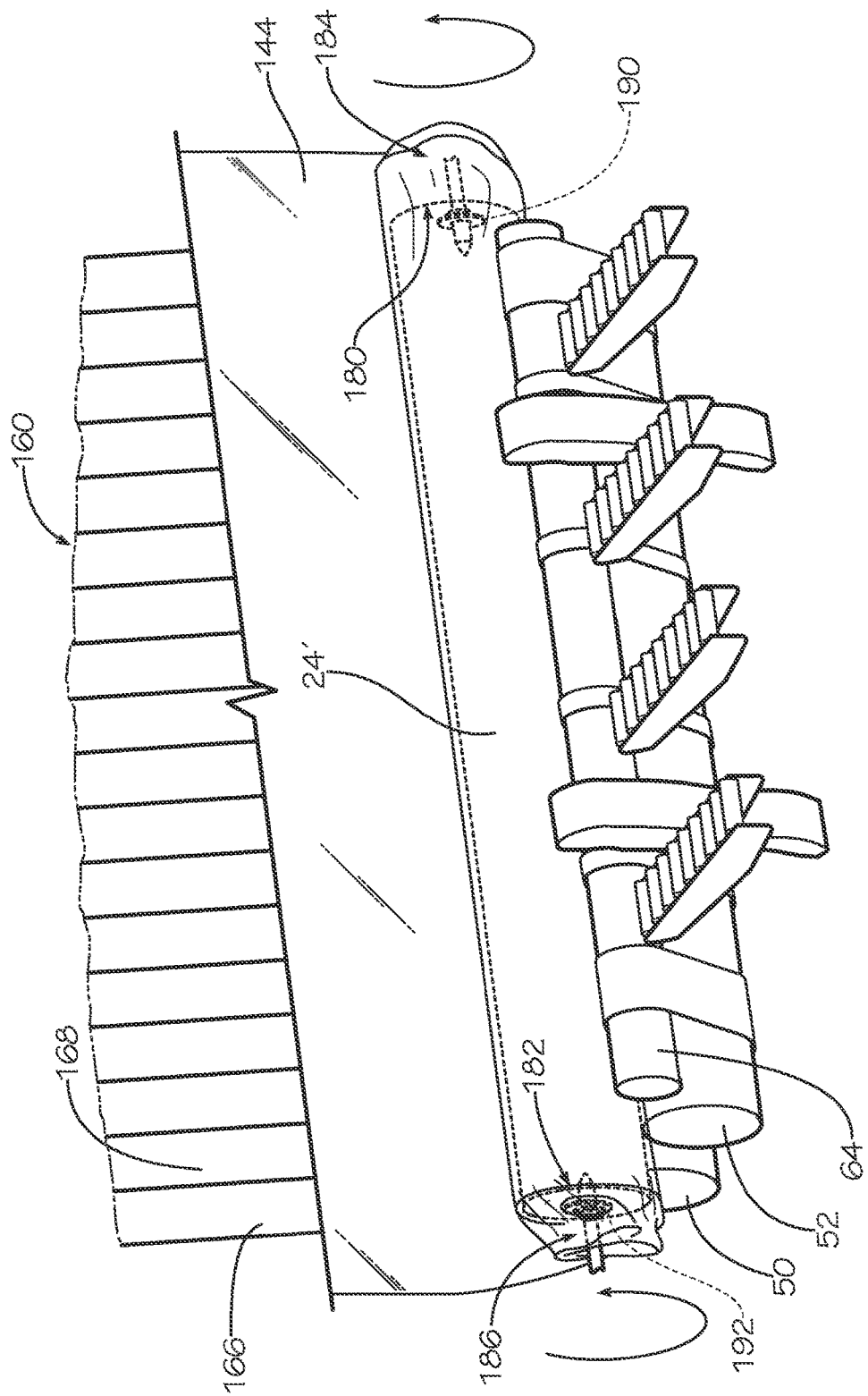
FIG. 11 is a schematic perspective view of the carpet wrapping station shown in FIG. 8 shown with the plastic wrapping film wrapped around a roll of carpet.

Disposed adjacent opposite ends of the main rollers 50, 52 are two movable plastic film capture members 190, 192. The capture members 190, 192 are aligned with the centerline between the two main rollers 50, 52. Each of the capture members 190, 192 is attached to a gear motor and chain drive (not shown) that moves the capture members up and down in the direction shown by the arrows 198, 200, respectively. The adjustment of the height of the capture members 190, 192 is adjusted so that the capture members contact the roll of carpet 24' at it's center of rotation. Since the carpet wrapping apparatus 10 is designed to accommodate rolls of carpet of different diameter, diameter information determined by the laser at the location 36 is used by the operator 78 and/or the computer controller (not shown) to determine the height for setting the capture members 190, 192. Pneumatic cylinders (not shown) are each attached to the capture members 190, 192 for moving the capture members toward and away from the roll of carpet 24' in the directions shown by the arrows 198, 200 (FIG. 5). The capture members 190, 192 are shown in the retracted position in FIGS. 5, 9 and 10 and in the plastic film capture position in FIGS. 11 and 12. Each of the capture members 190, 192 are rotatably mounted on an elongate shaft 202, 204, respectively, so that when the capture members are in the plastic film capture position and the roll of carpet 24' is rotated, the plastic film capture members will rotate with the sheet of plastic film 144 and roll of carpet.

Between the wrapping station 14 and the sealing station 16 are four roller conveyors 206, 208, 210, 212. Disposed between the roller conveyors 206-212 are two bumper arms 214, 216. The bumper arms 214, 216 are each pivotably mounted at their bottom ends 218, 220 so that the upper ends 222, 224 can move in an arc from a vertical position (FIG. 8 in heavy lines and FIG. 9) to an eject position (shown in light lines in FIG. 8). When in the vertical position, the bumper arms 214, 216 prevent the roll of carpet 24' from rolling off the rollers 50, 52, 62, 64 when the roll of carpet is initially rolled onto the rollers 50, 52, 62, 64 and when the roll of carpet is rotated on the rollers 50, 52, 62, 64. The rollers 50, 52, 62, 64 are mounted on a frame (not shown), which is attached to a pneumatic cylinder (not shown). The pneumatic cylinder attached to the frame supporting the rollers 50, 52, 62, 64 can be extended to tilt the rollers 50, 52, 62, 64 toward the roller conveyors 206-212 so that the roll of carpet 24' will roll off the rollers 50, 52, 62, 64 and will roll down the roller conveyors to the twisting/sealing station 16. The rollers 50, 52, 62, 64 and associated belts can also be rotated to facilitate the movement of the roll of carpet 24' from the wrapping station 14 to the twisting/sealing station 16. When the rollers 50, 52, 62, 64 are tilted, the bumper arms 214, 216 move from the vertical position to the retracted position. In the retracted position, the ends 222, 224 of the bumper arms 214, 216 are disposed below the roller conveyors 206-212 so that the bumper arms do not interfere with the roll of carpet 24' rolling down the roller conveyor onto the twisting/sealing station 16.

Figure 7:
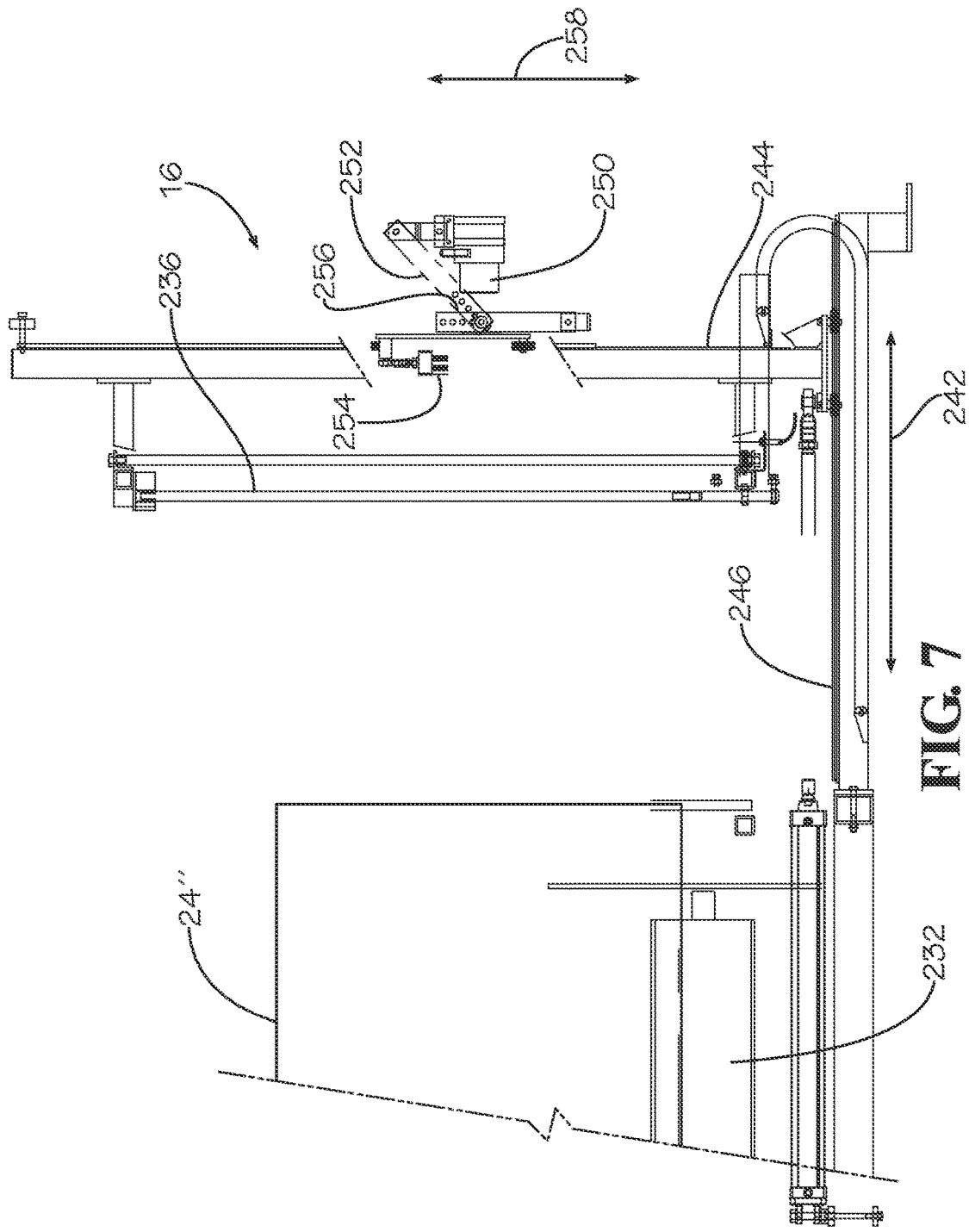
FIG. 7 is a partial side detail view of the twisting/sealing station shown in FIG. 1.
Figure 8:
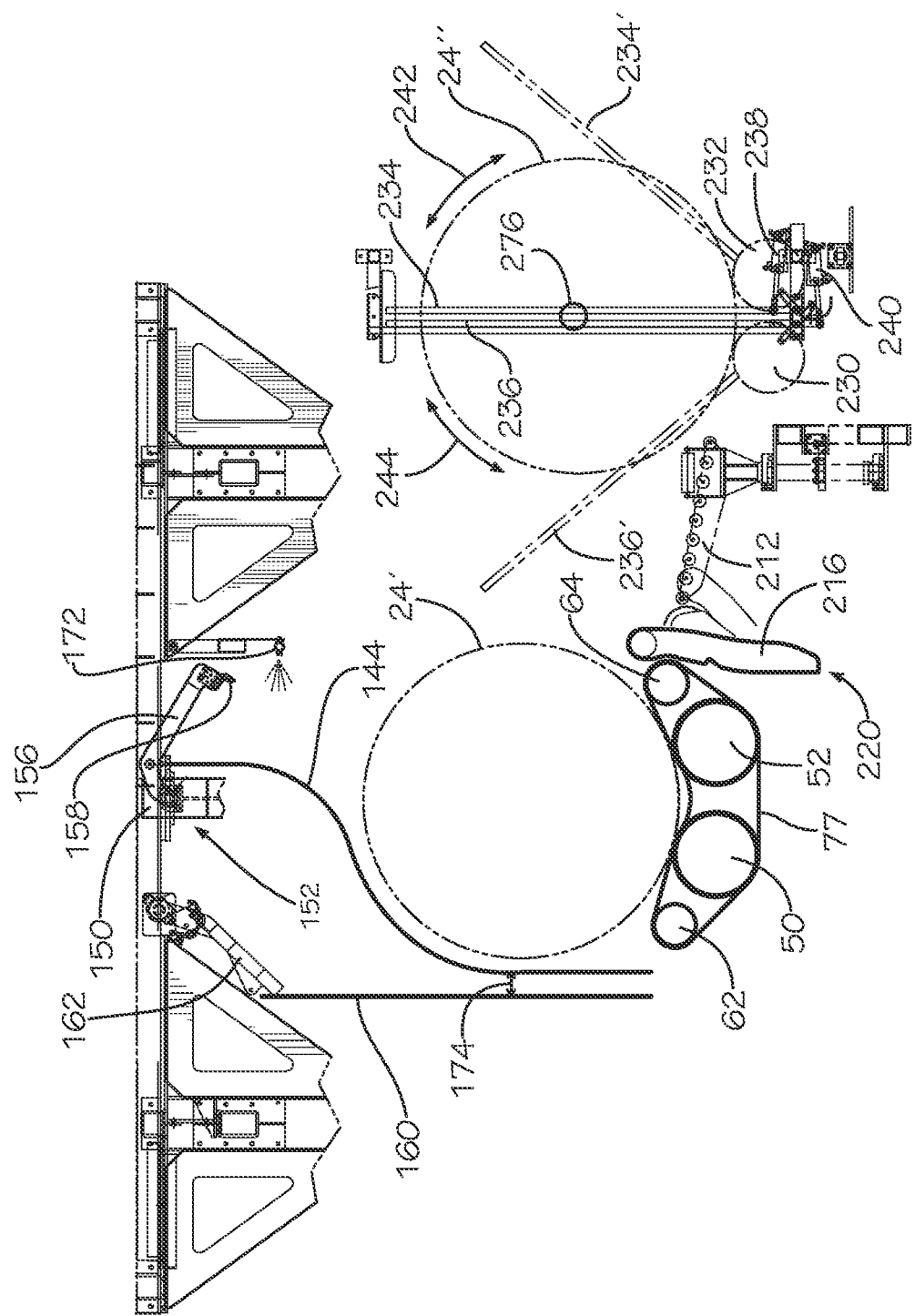
FIG. 8 is a schematic side view of the carpet wrapping station and the twisting/sealing station shown in FIG. 1 shown with the plastic wrapping film in the initial wrapping position.
Figure 13:
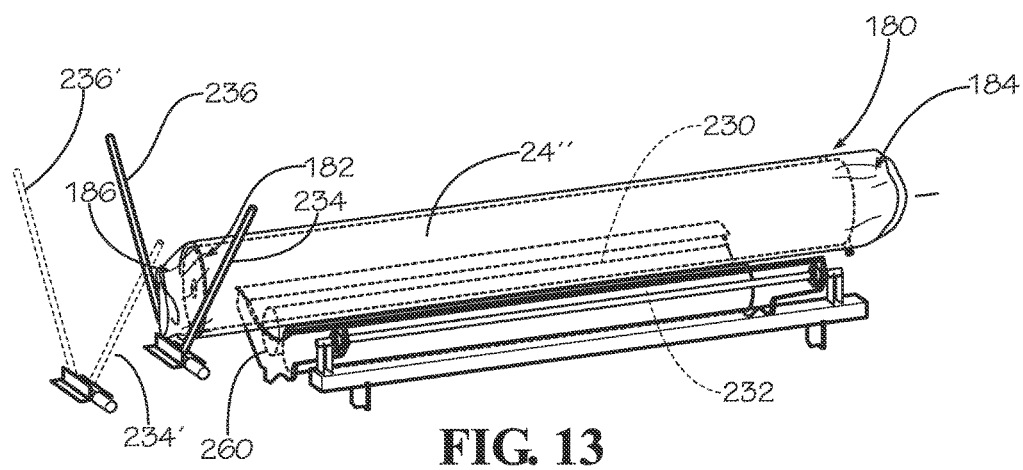
FIG. 13 is a schematic perspective view of the carpet twisting/sealing station shown in FIG. 8 shown in the initial position.
Figure 14:
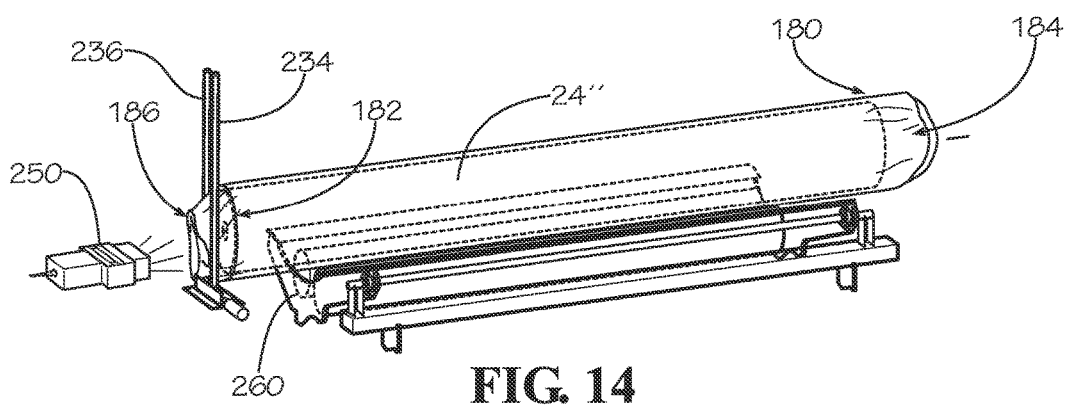
FIG. 14 is a schematic perspective view of the carpet twisting/sealing station shown in FIG. 8 shown with the elongate scissor members in a closed position.
Figure 15:
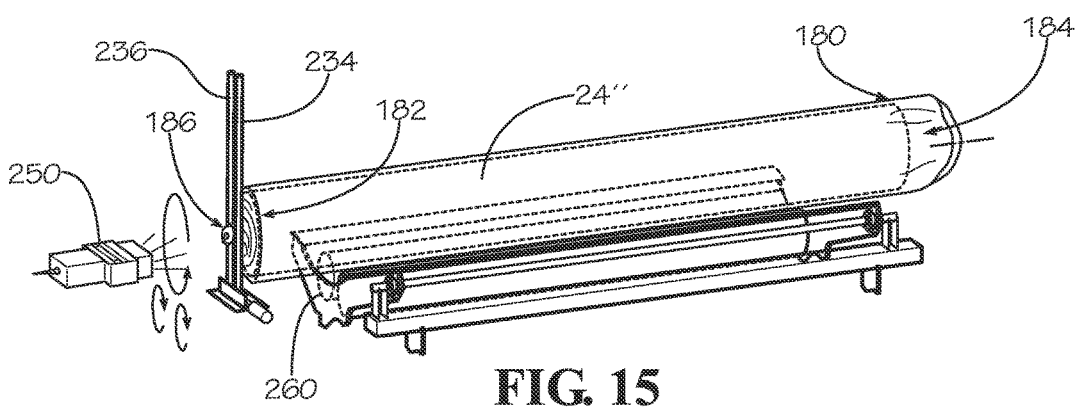
FIG. 15 is a schematic perspective view of the carpet twisting/sealing station shown in FIG. 8 shown with the plastic film twisted and sealed.

The twisting/sealing station 16 comprises a pair of rollers 230, 232 rotatably mounted at their ends. The rollers 230, 232 are rotatably driven by a motor (not shown). The motor (not shown) that drives the rollers 230, 232 is controlled by the operator 78 and/or by the computer controller (not shown) so that the speed and direction of the rotation of the rollers 230, 232 can be controlled and adjusted. The twisting/sealing station 16 also comprises a pair of elongate arms 234, 236 pivotably mounted at their lower ends 238. The elongate arms 234, 236 are each attached adjacent their lower ends to pneumatic cylinders 238, 240, respectively, which move the elongate arms in the direction shown by the arrows 242, 244 from an open position, shown in phantom in FIG. 8 and as shown in FIG. 13, to a closed position, as shown in FIG. 8 in solid and as shown in FIGS. 14 and 15, in a scissors-type movement. In the open position, the elongate arms 234, 236 are spread apart at approximately a 90-degree angle with respect to each other; and when in the closed position, the elongate arms are approximately parallel to each other. However, in the closed position the elongate arms 234, 236 are spaced from each other sufficiently for the end portion 186 of the sheet of plastic film 144 extending beyond the ends of the roll of carpet 24" to fit between the elongate arms, preferably approximately 0.5 inches to approximately 3 inches, more preferably approximately 1 inch. The elongate arms 234, 236 are also movable by the pneumatic cylinders 238, 240 from the closed position to the open position in the direction shown by the arrows 242 (FIG. 7). A pneumatic cylinder (not shown) moves a movable frame 244 upon which the open elongate arms 234', 236' are mounted. The movable frame 244 is disposed on a horizontal track 246 so that the open elongate arms 234', 236' move together from a retracted position, as shown in FIGS. 7 and 13 where the open elongate arms 234', 236' (shown in dotted in FIG. 13) are spaced from the end portion 186 of the sheet of plastic film 144 extending beyond the end 182 of the roll of carpet 24", to a twisting position, as shown in FIG. 13 where the open elongate arms 234', 236' (shown in solid) are disposed adjacent the end 182 of the roll of carpet 24" and such that the wrapped end portion 186 of the sheet of plastic film 144 extending beyond the end 182 of the roll of carpet 24" is disposed between the open elongate arms 234', 236' (FIG. 13). The pneumatic cylinders 238, 240 then move the open elongate arms 234', 236' to their closed position so that the wrapped end portion 186 of the sheet of plastic film 144 extending beyond the end 182 of the roll of carpet 24" is captured between the closed elongate arms 234, 236 (FIG. 14). The rollers 230, 232 are then rotated so that the roll of carpet 24" disposed on the rollers rotates so that the wrapped end portion 186 of the sheet of plastic film 144 extending beyond the end 182 of the roll of carpet 24" is twisted between the closed elongate arms 234, 236 (FIG. 15).

Also attached to the frame 244 is a heated blower 250. The blower is attached to an adjustable arm 252, which is attached to a pneumatic cylinder 254, which moves the heated blower up and down in the direction shown by the arrows 258. The heated blower 250 is also aligned with the longitudinal centerline between the rollers 230, 232. Therefore, when the roll of carpet 24" is positioned on the rollers 230, 232, the heated blower 250 can be raised or lowered to a height such that the heated blower blows heated air directly at the wrapped end portion 186 of the sheet of plastic film 144 extending beyond the end 182 of the roll of carpet 24" that is captured between the closed elongate arms 234, 236 (FIG. 14). The heated blower 250 provides sufficient heat to the wrapped end portion 186 of the sheet of plastic film 144 extending beyond the end 182 of the roll of carpet 24" so that when it is twisted the plastic film softens or melts enough to stick to itself thereby sealing the end 182 of the roll of carpet with plastic film (FIG. 15).

Although the elongate arms 234, 236 and heated blower 250 are shown as being disposed at one end 182 of the roll of carpet 24", it is specifically contemplated that an identical pair of elongate arms (not shown) and a heated blow (not shown) can be positioned at the other end 180 of the roll of carpet. With this alternate disclosed embodiment, both ends 184, 186 of the sheet of plastic film 144 wrapped around the roll of carpet 24" can be twisted and sealed on the ends of the roll of carpet.

The rollers 230, 232 are rotatably mounted on a V-shaped cradle 260. The V-shaped cradle 260 is pivotably mounted at one end so that it can tip toward the core insert station 18 thereby rolling the roll of carpet 24" from the twisting/sealing station 16 to the core insert station. The V-shaped cradle 260 is attached to a pneumatic cylinder 261 so that it can be tilted by the operator 78 or by the computer controller (not shown).

Figure 16:
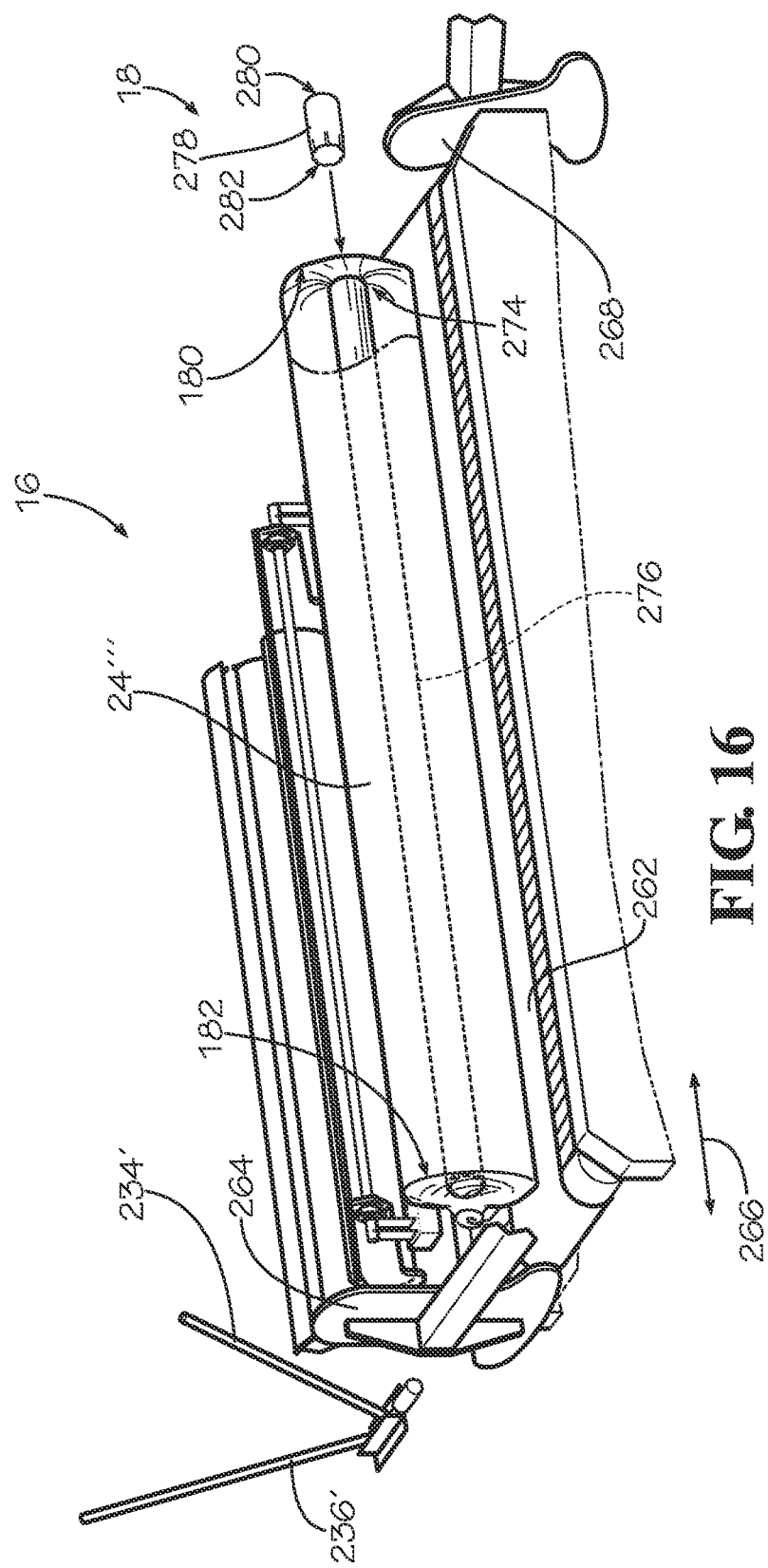
FIG. 16 is a schematic perspective view of the carpet wrapper twisting/sealing station shown in FIG. 8 and the carpet core inset station shown in FIG. 1 shown with the ram paddles in an initial position.
Figure 17:
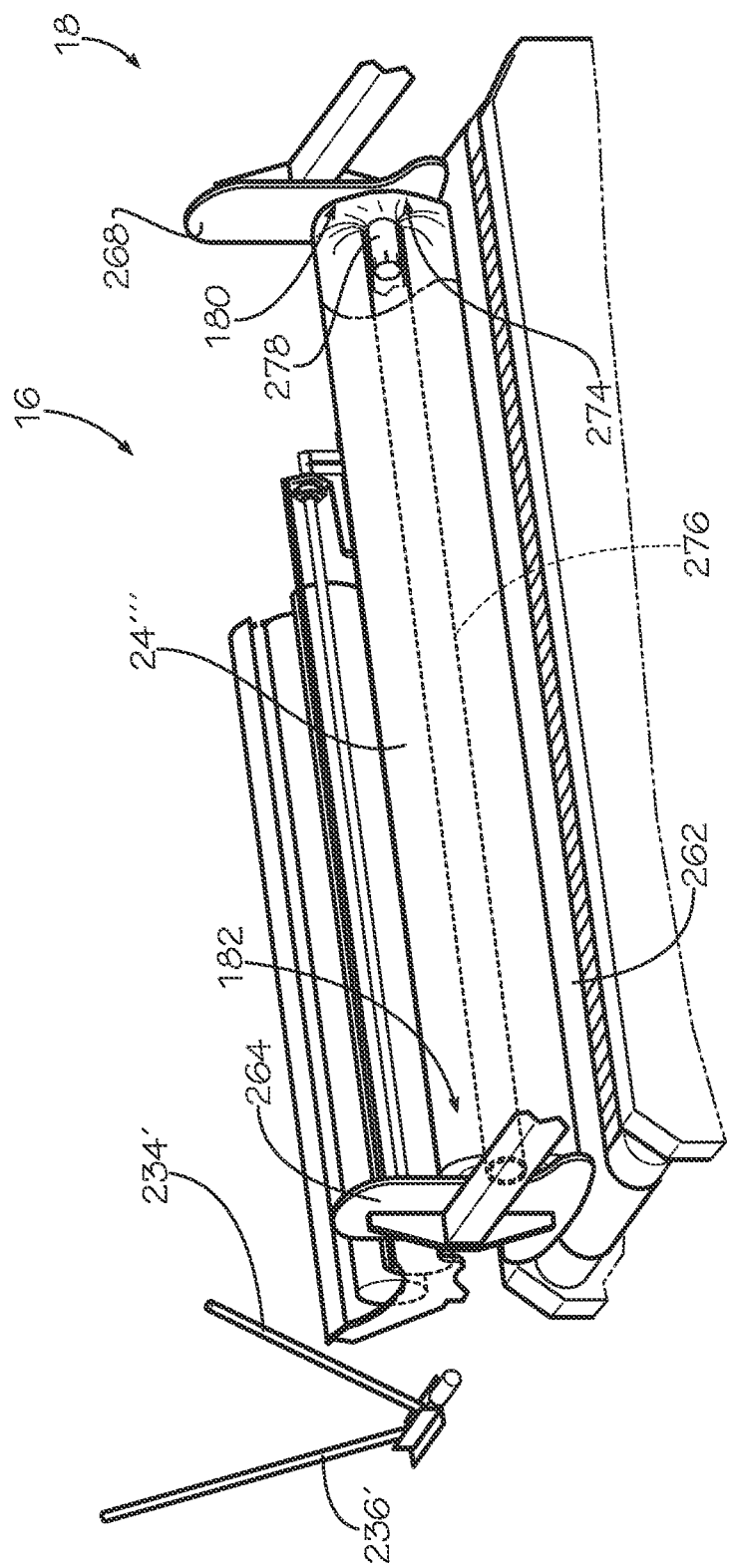
FIG. 17 is a schematic perspective view of the carpet wrapper twisting/sealing station shown in FIG. 8 and the carpet core inset station shown in FIG. 1 shown with the ram paddles in a position for seating a core insert into a carpet core.

The core insert station 18 comprises a conveyor belt 262. As shown in FIG. 16, the roll of carpet 24''' is disposed on the conveyor belt 262 after being rolled off of the twisting/sealing station 16. Disposed at one end 182 of the roll of carpet 24''' is a paddle 264 which is attached to a pneumatic piston (not shown) for moving the paddle 264 toward and away from the end 182 of the roll of carpet 24''' along the longitudinal axis of the roll of carpet and as shown by the arrows 266. As shown in FIG. 16, the paddle 264 is spaced from the end 182 of the roll of carpet 24''' in its retracted position. Disposed adjacent the other end 180 of the roll of carpet 24''' is a stationary paddle 268. The paddle 268 is pivotably mounted at one end 270 so that it can be moved up and down in an arc in the directions shown by the arrows 272 from it retracted position below the height of the conveyor belt 262, as shown in FIG. 16, to its blocking position above the height of the conveyor belt, as shown in FIG. 17. When the paddle 268 is in the retracted position, as shown in FIGS. 2 and 16, the operator 78 pushes the end portion 184 of the plastic film 144 extending beyond the end 180 of the roll of carpet 24''' into the open end 274 of the hollow cardboard tube or core 276 upon which the carpet is wound. One end 280 of a hollow cardboard core insert 278 has the same outside diameter as the core 276. However, the other end 282 of the core insert 278 has an outside diameter that is slightly less than the inside diameter of the core 276. Thus, the outside diameter of the core insert 278 tapers from the end 280 to the other end 282. The operator 78 manually inserts the end 282 (the narrower end) of the core insert 278 into the hollow open end 274 of the core 276 similar to putting a cork in the opening of a bottle. The paddle 268 is then moved up from its retracted position to its blocking position, as shown in FIG. 17. The paddle 264 is moved toward the roll of carpet 24''' until it contacts the end 182 thereof. The paddle 264 then pushes the roll of carpet 24''' until the other end 180 of the roll of carpet 24''' and the end 280 of the core insert 278 contacts the paddle 268. The paddle 264 then continues to push the roll of carpet 24''' with sufficient force that the paddle 268 pushes the core insert 278 into the core 276. The core insert 278 therefore traps the end portion 184 of the plastic film 144 that was stuffed by the operator into the core 276 between the core insert and the core 276. And, since the core insert 278 is hollow, an elongate lifting arm on a fork lift (not shown) can be inserted into the core insert and the core 276 in order to lift the roll of carpet 24''' for moving from one position to another, as is a common practice in the industry.

After the core insert 278 is inserted into the core 276, the paddles 264, 268 are both moved to their retracted positions, as shown in FIGS. 2 and 16. The roll of carpet 24''' is then moved by the conveyor belt 262 from the core insert station 18 to the out-feed conveyor 20 where it can be moved further for storage or delivery to a customer.

Operation of the carpet wrapping apparatus 10 will now be considered. The process begins by placing a roll of carpet 24 on the staging table. The roll of carpet 24 is wound around an elongate hollow cardboard tube or core 276. The roll of carpet has a width of from 12 to 15 feet. The length of the core 276 is the same as the width of the roll of carpet 24. The length of the carpet in the roll can vary depending on manufacturing and/or customer requirements. However, the longer the length of the carpet in the roll, the greater the diameter of the roll of carpet 24; the shorter the length of the carpet in the roll, the smaller the diameter of the roll of carpet. However, it is an object of the present invention to be able to wrap rolls of carpet of different widths and different lengths (i.e., different roll diameters) in plastic film. The conveyor belts on the staging table 11, such as the conveyor belt 26, move the roll of carpet 24 from the staging table onto the V-shaped bed 22 of the carpet roll centering station 12.

At the centering station 12, two functions are performed. First, the photo detector at 34 (FIG. 1) and the laser at 36 (FIG. 2) measure the width of the roll of carpet 24 and the diameter of the roll of carpet, respectively. Second, the roll of carpet 24 is centered for subsequent processing at the wrapping station 14 and twisting/sealing station 16. The measured width of the roll of carpet 24 is used to determine how the roll of carpet is to be centered; i.e., whether the roll of carpet is 12-feet wide or 15-feet wide. For a 15-foot wide roll of carpet 24', the ends of the roll are positioned to be aligned with the lines 30, 30'; for a 12-foot wide roll, the ends of the roll of carpet are aligned with the lines 32, 32'. The roll of carpet 24 is centered at the centering station 12 by moving the roll of carpet on the V-shaped bed 22 using the movable shuttle 28. After the roll of carpet 24 is centered at the centering station 12, the pneumatic cylinder 40 is actuated to tip the V-shaped bed 22 so that the roll of carpet 24 rolls off the V-shaped bed, down the pivot arms 42-46 and onto the rollers 50, 52, 62, 64 of the wrapping station 14. The bumper arms 214, 216 prevent the roll of carpet 24' from rolling off the wrapping station 14. The roll of carpet 24' thus ends up disposed and centered on the main rollers 50, 52.

At the wrapping station 14, the measured width and diameter information for the roll of carpet 24' determined at the centering station 12 are used to select from the rolls of plastic film 136-142 the proper width of the plastic film to be used to wrap the roll of carpet. The width of the plastic film used to wrap the roll of carpet 24' must be both wide enough for the width of the roll of carpet; i.e., 12 feet to 15 feet wide, but it must also be wide enough to cover more than one-half both ends of the roll of carpet, preferably enough to entirely cover both ends of the roll of carpet so that the excess plastic film can be twisted and sealed to cover at least one of the ends of the roll of carpet. Therefore, the diameter of the roll of carpet 24' must also be taken into consideration in selecting the proper width of the plastic film used to wrap the roll of carpet. When the proper width of the plastic film is determined, the plastic film transport cradle 80 is moved so that the selected roll of plastic film 136-142 is moved to the plastic film dispensing position (as illustrated by the roll 142 in FIG. 2). At the same time that the appropriately sized roll of plastic film is selected, the curtain 160 is positioned correctly based on the diameter of the roll of carpet 24'. The curtain 160 is positioned by actuating the pneumatic cylinder 164 which moves the swing arm 162 so that there is a horizontal gap 174 between the curtain and the roll of carpet 24' (FIG. 8). The curtain 160 is of a size such that the bottom of the curtain is approximately even with the roller 54 (FIG. 8). The gap 174 is of a size such that the nozzles 172 blow the sheet of plastic film 144 down into the gap. Thus, the gap 174 is preferably approximately 1 inch to approximately 4 inches, more preferably approximately 2.5 inch.

Figure 9:
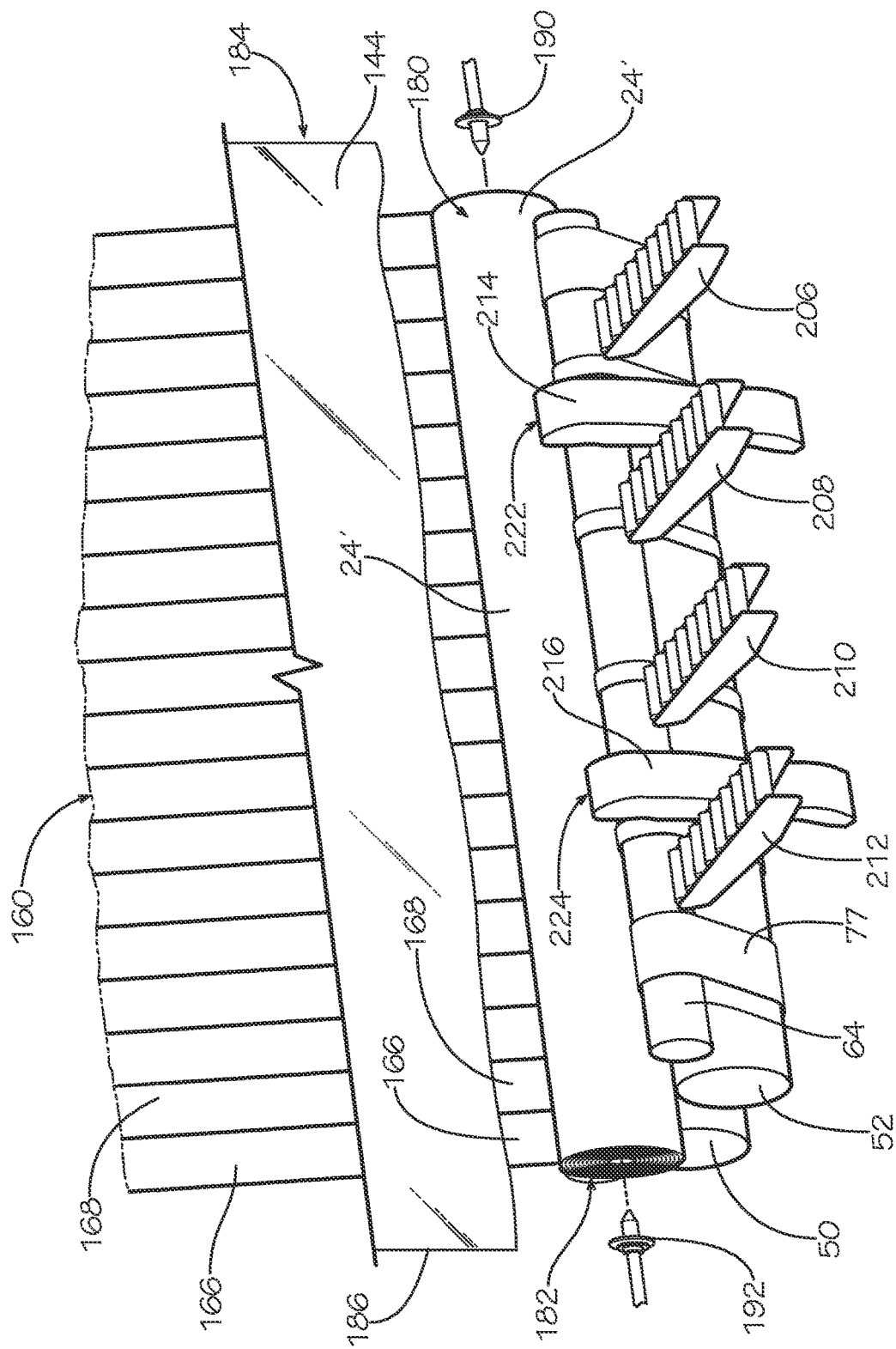
FIG. 9 is a schematic perspective view of the carpet wrapping station shown in FIG. 8 shown with the plastic wrapping film in the initial wrapping position.

The sheet of plastic film 144 is fed downwardly from the roll 142 (FIG. 2). The sheet of plastic film 144 is disposed between the sealing beam 150 and the nozzles 172. Pressurized air from the nozzles 172 blows the sheet of plastic film toward the curtain 160 (FIG. 9). As the sheet of plastic film 144 continues to move downwardly, the air from the nozzles 172 blows the lower portion of the sheet of plastic film into the gap 174 (FIG. 8). The sheet of plastic film 144 is fed downwardly until the bottom of the sheet of plastic film is approximately even with the roller 54 (FIG. 8). Simultaneously, pressurized air from the nozzles 176, 178 blows the edge portions 184, 186 of the sheet of plastic film 144 around the ends 180, 182, respectively, of the roll of carpet 24' (FIG. 10). The plastic film capture members 190, 192 are then moved toward the ends 180, 182 of the roll of carpet 24' until the edge portions 184, 186 of the sheet of plastic film 144 are captured between the plastic film capture members and the ends 180, 182 of the roll of carpet. The rollers 50, 52 are then rotated slightly clockwise so that the roll of carpet 24' rotates in a counter-clockwise direction, thus tensioning the sheet of plastic film 144. Since the plastic film capture members 190, 192 are pressing on the edge portions 184, 186 of the sheet of plastic film 144 and the ends 180, 182 of the roll of carpet 24', the plastic film capture members rotate with the roll of carpet. Since the edge portions 184, 186 of the sheet of plastic film 144 are captured between the ends 180, 182 of the roll of carpet 24' and the plastic film capture members 190, 192, as the roll of carpet rotates, the sheet of plastic film is pulled under the roll of carpet. The roll of carpet 24' is rotated sufficiently such that the sheet of plastic film 144 is wrapped completely around the roll of carpet and there are at least two layers of plastic film at the top of the roll of carpet. The rotation of the roll of carpet 24' is then stopped and the sealing beam 150 is lowered until the lower edge 152 of the sealing beam, which comprises a heated sealing element, contacts the sheet of plastic film 144 on the top of the roll of carpet 24' (FIG. 12). The roll of plastic film 132 is rotated slightly in order to tension the sheet of plastic film 144. Then, the sealing element on the bottom of the sealing beam 150 is energized to heat the sealing element sufficiently so that the at least two layers of plastic film at the top of the roll of carpet 24' are softened or melted sufficiently so that one layer of plastic film is adhered to the other layer of plastic film. The heat from the sealing element is also sufficient to sever the sheet of plastic film 144 from the plastic film wrapped around the roll of carpet 24'. Since the sealing element is only as wide as the roll of carpet 24', it is necessary to sever the edge portions 184, 186 of the sheet of plastic film 144 adjacent to sealed plastic film portion on the top of the roll of carpet. Therefore, when the sealing beam 150 is lowered onto the top of the roll of carpet 24', the plastic film chopper bars 154, 156 are pivoted from their retracted position to the plastic film cutting position where the edge portions 184, 186 of the sheet of plastic film 144 extending above the roll of carpet are trapped between the knife blade 158 of the chopper bars and the sealing beam, thereby cutting the portion of sheet of plastic film that is wider then the roll of carpet; i.e., the portion expending beyond the ends 180, 182 of the roll of carpet. The sealing beam 150 is then raised to the retracted position and the sheet of plastic film 144 that was severed from the plastic film wrapped around the roll of carpet 24' is wound back onto the roll 142 to the position shown in FIG. 2.

The embodiment of the present invention described above where the carpet is rotated counter-clockwise to wrap the plastic film around the roll of carpet is appropriate for rolls of carpet where the pile of the carpet faces inwardly. However, some manufacturers or some types of carpet have the pile of the carpet facing outwardly; i.e., the carpet is rolled into a roll in the opposite direction of the carpet where the pile faces inwardly. Therefore, for those situations where the roll of carpet has the pile facing outwardly, the curtain 160, the chopper bars 154, 156, the nozzles 172 and the nozzles 176, 178 must be moved to the opposite side of the roll of carpet 24' from what is shown in the drawings. The plastic film is then wrapped around the roll of carpet by rotating the roll in a clockwise direction.

After the roll of carpet 24' is wrapped in the plastic film, the pneumatic cylinder (not shown) is actuated to tilt the rollers 50-56 of the wrapping station 14. The bumper arms 214, 216 move from their vertical position (FIG. 8) to their retracted position so that the roll of carpet 24' rolls down the roller conveyors 206-212 and onto the rollers 230, 232 of the twisting/sealing station 16. After the roll of carpet 24' leaves the wrapping station 14, the rollers 50-56 are returned to their non-tilted position and the bumper arms 214, 216 are returned to their vertical position, as shown in FIG. 8, so that the wrapping station is ready to receive another roll of carpet for wrapping.

At the twisting/sealing station 16, the elongate arms 234', 236' are initially in their open position and are in their refracted position spaced from the end 182 of the roll of carpet 24", as shown in phantom in FIG. 13. The pneumatic cylinder (not shown) moves the frame 244 horizontally to move the elongate arms 234', 236' from their retracted position to their twisting position, as shown in solid in FIG. 13. Simultaneously, the cylinder 256 moves the heated blower 250 up or down in the direction shown by the arrows 258 so that the heated blower is aimed directly at the core 276 of the roll of carpet 24". The motor (not shown) rotates the rollers 230, 232 in a clockwise direction so that the roll of carpet 24" rotates in a counter-clockwise direction. While the roll of carpet 24" is rotating, the elongate arms 234', 236' are moved from their open position to their closed position so that the wrapped end portion 186 of the sheet of plastic film 144 extending beyond the end 182 of the roll of carpet 24" is captured between the closed elongate arms 234, 236 (FIG. 14). Simultaneously, the heated blower 250 is actuated so that it blows heated air toward the wrapped end portion 186 of the sheet of plastic film 144 extending beyond the end 182 of the roll of carpet 24" that is captured between the closed elongate arms 234, 236. As the roll of carpet 24" rotates, the wrapped end portion 186 of the sheet of plastic film 144 extending beyond the end 182 of the roll of carpet is twisted between the closed elongate arms 234, 236. And, the heated air from the heated blower 250 melts or softens the end portion 186 of the sheet of plastic film 144 sufficiently to adhere to itself thereby sealing the end 182 of the roll of carpet with the plastic film (FIG. 15). The roll of carpet 24" is rotated sufficiently so that the twisting of the wrapped end portion 186 of the sheet of plastic film 144 extending beyond the end 182 of the roll of carpet 24" is drawn tightly around the end of the roll of carpet. After the wrapped end portion 186 the roll of carpet 24" is twisted and sealed, the elongate arms 234, 236 are moved to their open position by the pneumatic cylinders 238, 240 so that the wrapped end portion 186 of the sheet of plastic film 144 is no longer captured between the open elongate arms 234', 236'. The pneumatic cylinder (not shown) then moves the frame 244, the open elongate arm 234', 236' and the heated blower 250 to their retracted position spaced from the end 182 of the roll of carpet 24" (as shown in dotted in FIG. 13). The pneumatic cylinder 261 tilts the V-shaped cradle 260 so that the roll of carpet 24" rolls off the V-shaped cradle onto the conveyor belt 262 of the core insert station 18. The pneumatic cylinder 261 then returns the V-shaped cradle 260 to its non-tilted position so that it is ready to receive another roll of carpet from the wrapping station 14.

At the core insert station 18, the paddle 264 is initially spaced from the roll of carpet 24''' and the paddle 268 is in its retraced position. The operator 78 manually pushes the end portion 184 of the plastic film 144 extending beyond the end 180 of the roll of carpet 24''' into the open end 274 of the core 276. The operator 78 manually inserts the end 282 (the narrower end) of the core insert 278 into the hollow open end 274 of the core 276. The paddle 268 is then moved up from its retracted position to its stationary, blocking position, as shown in FIG. 17. The paddle 264 is moved toward the roll of carpet 24''' until it contacts the end 182 thereof. The paddle 264 then pushes the roll of carpet 24''' until the end 180 of the roll of carpet 24''' and the end 280 of the core insert 278 contacts the paddle 268. The paddle 264 then continues to push the roll of carpet 24''' with sufficient force that the paddle 268 pushes the core insert 278 into the core 276. After the core insert 278 is inserted into the core 276, the paddles 264, 268 are both moved to their retracted positions, as shown in FIGS. 2 and 16. The roll of carpet 24''' is then moved by the conveyor belt 262 from the core insert station 18 to the out-feed conveyor 20 where it can be moved further for storage or delivery to a customer.

Although the embodiments of the present invention have been described above as being used to wrap a roll of carpet, it is specifically contemplated that the present invention can be used to wrap any other sufficiently flexible material that can be rolled into a roll. Thus, the present invention can be used to wrap rolls of vinyl sheet material, roofing material, and other similar materials.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A wrapping apparatus comprising:
   a pair of rotatable rollers for supporting an elongate roll of sheet material and for rotating the elongate roll of sheet material on a longitudinal axis while supported thereon;
   a vertically extending curtain disposed adjacent and spaced from the roll of sheet material so that there is a horizontal gap between the curtain and the roll of sheet material when supported on the rollers, wherein the curtain has a primary surface;
   a source of pressurized air positioned above the pair of rollers and directed toward the primary surface of the curtain; and
   a plastic film dispenser disposed above the rollers for dispensing a plastic film downwardly between the curtain and the source of pressurized air so that the pressurized air blows the plastic film toward the primary surface of the curtain and into the horizontal gap.

2. The wrapping apparatus of claim 1 further comprising a second source of pressurized air directed toward an edge portion of the plastic film when disposed between the horizontal gap such that the edge portion overlies an end of the elongate roll of sheet material.

3. The wrapping apparatus of claim 2 further comprising a movable plastic film gripping member having an end portion disposed for capturing the edge portion of the plastic sheet material between the end of the gripping member and the end of the roll of sheet material when disposed on the rollers, wherein the gripping member is moveable in a direction parallel to the longitudinal axis of the elongate toll of the sheet material.

4. The wrapping apparatus of claim 3 further comprising a plastic film sealing bar disposed above the rollers and selectively engagable with the plastic film when wrapped around the roll of sheet material disposed on the rollers.

5. The wrapping apparatus of claim 4 further comprising a cutter bar disposed above the rollers and selectively engageable with plastic film extending from the plastic film dispenser to the roll of sheet material.

6. The wrapping apparatus of claim 1, wherein the curtain comprises a plurality of elongate adjacent strips of material so that air can pass between adjacent elongate strips of material.

7. The wrapping apparatus of claim 1, wherein the roll of sheet material is carpet, vinyl sheet material or roofing material.

8. The wrapping apparatus of claim 1, wherein the roll of sheet material is carpet.

* * * * *